United States Patent
Xu et al.

(10) Patent No.: US 12,532,159 B2
(45) Date of Patent: Jan. 20, 2026

(54) VOICE OVER NEW RADIO USER IDENTIFICATION METHOD AND BASE STATION

(71) Applicant: ZTE CORPORATION, Guangdong (CN)

(72) Inventors: Hairong Xu, Guangdong (CN); Jianhua Lin, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 472 days.

(21) Appl. No.: 17/768,847

(22) PCT Filed: Sep. 15, 2020

(86) PCT No.: PCT/CN2020/115394
§ 371 (c)(1),
(2) Date: Apr. 13, 2022

(87) PCT Pub. No.: WO2021/077945
PCT Pub. Date: Apr. 29, 2021

(65) Prior Publication Data
US 2024/0137749 A1   Apr. 25, 2024
US 2024/0236647 A9   Jul. 11, 2024

(30) Foreign Application Priority Data

Oct. 22, 2019 (CN) .......................... 201911007379.8

(51) Int. Cl.
*H04W 8/22* (2009.01)
*H04W 68/00* (2009.01)
*H04W 76/19* (2018.01)

(52) U.S. Cl.
CPC ............. *H04W 8/22* (2013.01); *H04W 68/00* (2013.01); *H04W 76/19* (2018.02)

(58) Field of Classification Search
CPC ....... H04W 8/22; H04W 68/00; H04W 76/19; H04W 76/27; H04W 76/11
See application file for complete search history.

(56) References Cited

U.S. PATENT DOCUMENTS

2013/0095862 A1 *  4/2013  Bejerano ............... H04W 68/02
                                                                   455/458
2017/0078862 A1 *  3/2017  Artuso .................. H04W 8/005
(Continued)

FOREIGN PATENT DOCUMENTS

CN         1367989 A       9/2002
CN       108934050 A      12/2018
(Continued)

OTHER PUBLICATIONS

Huawei, et al., HO and redirection from NR to LTE due to EPS fallback, 3GPP TSG-RAN2 Meeting #107bis, Oct. 4, 2019, 19 pgs.
(Continued)

*Primary Examiner* — Chirag G Shah
*Assistant Examiner* — Joshua Y Smith
(74) *Attorney, Agent, or Firm* — Li & Cai Intellectual Property (USA) Office

(57) ABSTRACT

A voice over new radio (VoNR) user identification method is provided, including: in response to a RRC connection resume request, extracting an identifier of a user terminal from the RRC connection resume request; querying whether the identifier of the user terminal is stored in a preconfigured database, where several identifiers and storage write times respectively corresponding to the several identifiers are stored in the database; in response to querying that the identifier of the user terminal is stored in the database, calculating a time difference between a time at which the RRC connection resume request is received and a storage write time corresponding to the identifier of the user terminal; in response to determining that the time difference is (Continued)

shorter than a valid duration threshold, identifying that the user terminal is a VoNR user terminal. A base station and a computer-readable medium are further provided.

17 Claims, 7 Drawing Sheets

(56) References Cited

U.S. PATENT DOCUMENTS

| | | | | |
|---|---|---|---|---|
| 2018/0288734 | A1* | 10/2018 | Islam | H04W 68/00 |
| 2018/0324751 | A1* | 11/2018 | Hampel | H04W 76/18 |
| 2019/0116582 | A1* | 4/2019 | Pelletier | H04W 72/56 |
| 2021/0096918 | A1* | 4/2021 | Ogawa | G06F 9/5044 |
| 2021/0352531 | A1* | 11/2021 | Vesely | H04W 76/19 |
| 2021/0352547 | A1* | 11/2021 | Chang | H04W 76/27 |

FOREIGN PATENT DOCUMENTS

| | | |
|---|---|---|
| CN | 109756900 A | 5/2019 |
| WO | 100456881 C | 1/2009 |
| WO | 2018208956 A1 | 11/2018 |
| WO | 2019196785 A1 | 10/2019 |

OTHER PUBLICATIONS

3GPP Organizational Partners, 3GPP TS 38.423 Protocol, http://www.3gpp.org, Sep. 24, 2018, 263 pgs.

3GPP Organizational Partners, 3GPP TS 38.473 Protocol, http://www.3gpp.org, Jul. 2, 2018, 161 pgs.

ZTE Corporation, International Search Report with English Translation, PCT/CN2020/115394, Dec. 17, 2020, 6 pgs.

* cited by examiner

VOICE OVER NEW RADIO USER IDENTIFICATION METHOD AND BASE STATION

CROSS REFERENCE TO RELATED APPLICATIONS

The present application is a United States National Stage Application filed under 35 U.S.C. § 371 of PCT Patent Application Ser. No. PCT/CN2020/115394, filed Sep. 15, 2020, which claims priority to Chinese Patent Application No. 201911007379.8 filed on Oct. 22, 2019, each of which is incorporated herein by reference in its entirety.

TECHNICAL FIELD

The present disclosure relates to the field of communication technologies, and in particular, to a voice over new radio (VoNR) user identification method, a base station, and a computer-readable medium.

BACKGROUND

At present, various operators pay more attention to experience of voice over new radio (VoNR for short) users, so a base station has a set of guarantee policies for such users. When the guarantee policy takes effect, it is necessary to first identify that a user is the VoNR user terminal. A usual method to identify whether the user terminal is the VoNR user terminal is based on whether the user carries a 5G quality of service identifier (5QI)1/5QI2 bearer after the user establishes a service. However, for some guarantee policies, it needs to identify in a user access phase whether the user is the VoNR user terminal.

In related art, the protocol already supports to identify whether a calling user is the VoNR user terminal according to a radio resource control (RRC) connection resume cause of random access information 3 (also known as MSG3) in a connection resume phase of an inactive user. However, identifying whether a called user is the VoNR user terminal is not realized at present, so that the base station is unable to preferably run a guarantee policy for the called user.

SUMMARY

Embodiments of the present disclosure provide a voice over new radio (VoNR) user identification method, a base station, and a computer-readable medium.

Some embodiments of the present disclosure provide a VoNR user identification method, including: in response to a RRC connection resume request, extracting an identifier of a user terminal from the RRC connection resume request; querying whether the identifier of the user terminal is stored in a preconfigured database, where several identifiers and a storage write time corresponding to each of the several identifiers are stored in the database; in response to querying that the identifier of the user terminal is stored in the database, calculating a time difference between a time at which the RRC connection resume request is received and a storage write time corresponding to the identifier of the user terminal in the database; determining whether the time difference is shorter than a predefined valid duration threshold; and in response to determining that the time difference is less than the valid duration threshold, identifying that the user terminal is a VoNR user terminal.

Some embodiments of the present disclosure further provide a base station, including: an extraction module configured to extract, in response to a RRC connection resume request, an identifier of a user terminal from the RRC connection resume request; a query module configured to query whether the identifier of the user terminal is stored in a preconfigured database, where several identifiers and a storage write time corresponding to each of the several identifiers are stored in the database; a calculation module configured to calculate, in response to querying that the identifier of the user terminal is stored in the preconfigured database, a time difference between a time at which the RRC connection resume request and a storage write time corresponding to the identifier of the user terminal in the database; a determination module configured to determine whether the time difference is shorter than a predefined valid duration threshold; and an identification module configured to identify, when the determination module determines that the time difference is shorter than the valid duration threshold, that the user is a VoNR user terminal.

Some embodiments of the present disclosure further provide a computer-readable medium storing a computer program that, when executed by a processor, causes the processor to perform operations of the method according to the foregoing embodiments.

Some embodiments of the present disclosure further provide a base station, including a memory and a processor. The memory stores a program that, when read and executed by the processor, causes the processor to perform the VoNR user identification method as described above.

DETAILED DESCRIPTION OF THE EMBODIMENTS

Figure 1:
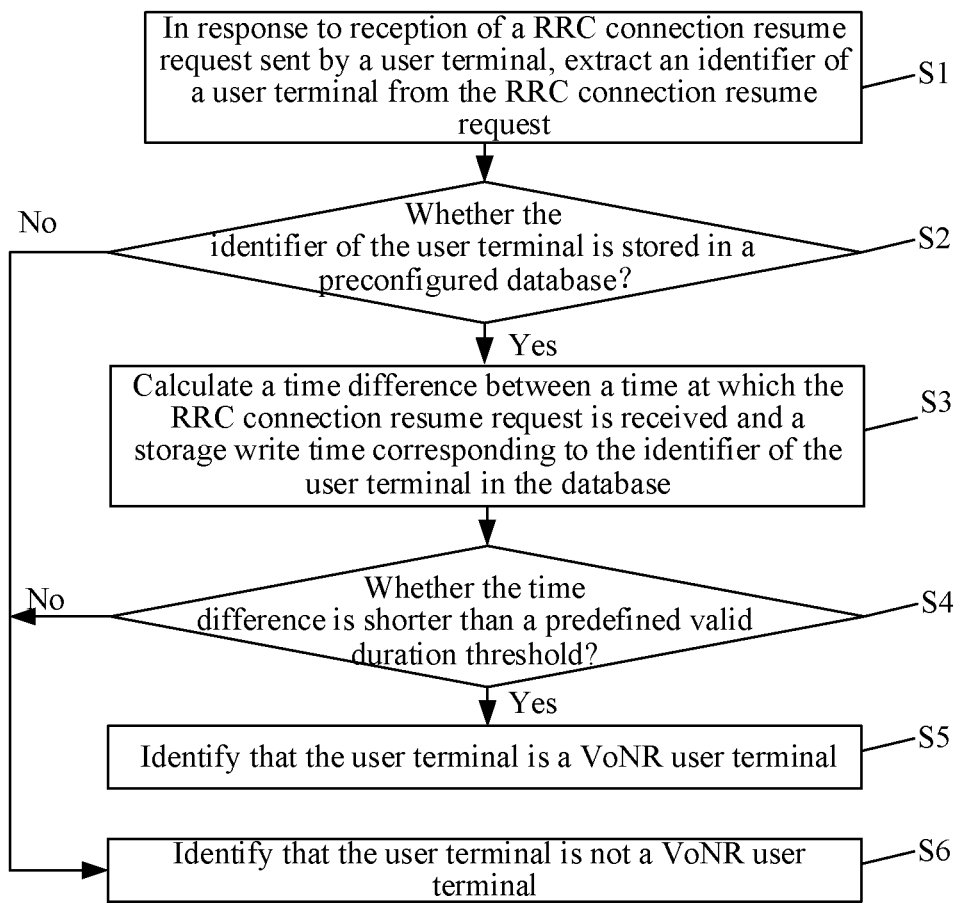
FIG. 1 is a flowchart of a voice over new radio (VoNR) user identification method according to an embodiment of the present disclosure.

In order to enable those skilled in the art to better understand the technical solution of the present disclosure, a voice over new radio (VoNR) user identification method, a base station, and a computer-readable medium provided in the present disclosure are described in detail below with reference to the accompanying drawings.

Exemplary embodiments are described more fully hereinafter with reference to the accompanying drawings. The exemplary embodiments may be embodied in different forms and should not be construed to be limited to the embodiments described herein. On the contrary, providing these embodiments is to make the present disclosure clear and complete, and enable those skilled in the art to fully understand the scope of the present disclosure.

The terms used herein are only used to describe particular embodiments and are not intended to limit the present disclosure. As used herein, singular forms "a" and "the" are intended to include the plural forms as well, unless the context clearly dictates otherwise. It can also be understood that the terms "including/comprising" and/or "consist of" used in this specification indicate the presence of a feature, an integer, a step, an operation, an element, and/or a component, but do not exclude the presence or addition of one or more other features, integers, steps, operations, elements, components, and/or groups thereof.

The technical solution of the present disclosure is applied to a VoNR service, and can effectively identify whether a called user in an inactive state is a VoNR user terminal, so that a base station can adopt different admission or quality of service (QoS) policies for different types of user terminals, thereby maximizing the use of an operator's system capacity and improving user experience.

In order to facilitate those skilled in the art to understand the technical solutions of the present disclosure, a process of establishing a voice call between a calling terminal and a called terminal in the related art is described below in detail. First, the calling terminal initiates a random access to resume a radio resource control (RRC) connection with one of surrounding base stations, and a state of the calling terminal is switched from an inactive state to an active state. Thereafter, the base station that establishes the RRC connection with the calling terminal sends paging information for the VoNR service to a base station to which the called terminal currently belongs. In response to reception of the paging information, the base station to which the called terminal currently belongs triggers a radio access network (RAN) paging procedure. The base station to which the called terminal currently belongs sends RAN paging to the called terminal. In response to the RAN paging, the called terminal triggers a RRC connection resume procedure. That is, the called terminal initiates the random access to resume RRC connection with one of surrounding base stations, such that a high-definition call may be conducted between the calling terminal and the called terminal.

It is to be noted that, a user terminal in following embodiments refers to the "called terminal".

FIG. 1 is a flowchart of a voice over new radio user identification method according to an embodiment of the present disclosure. The method is performed by a base station and includes following operations.

At S1, in response to reception of a RRC connection resume request sent by a user terminal, an identifier of the user terminal is extracted from the RRC connection resume request.

After receiving the RRC connection resume request sent by the user terminal, the base station extracts an identity identifier (hereinafter called identifier) of the user terminal from the RRC connection resume request.

In some embodiments, the identifier is an inactive-radio network temporary identity (I-RNTI for short).

In practical applications, depending on a device type of the user terminal, the RRC connection resume request sent by the user terminal may be RRCResumeRequest or RRCResumeRequest1. The I-RNTI (also called short I-RNTI) in the RRCResumeRequest has 24 bits, and the I-RNTI in the RRCResumeRequest1 has 40 bits.

At S2, query whether the identifier of the user terminal is stored in a preconfigured database.

Several identifiers and a storage write time corresponding to each of the several identifiers are stored in the database.

In operations at S2, when it is queried that the identifier of the user terminal is stored in the database, proceed to operations at S3. Alternatively, when it is queried that the identifier of the user terminal is not stored in the database, proceed to operations at S6.

At S3, a time difference between a time at which the RRC connection resume request is received and a storage write time corresponding to the identity of the user terminal in the database is calculated.

At S4, determine whether the time difference is shorter than a predefined valid duration threshold.

In response to determining that the time difference is shorter than the valid duration threshold, proceed to operations at S5. Alternatively, in response to determining that the time difference is greater than or equal to the valid duration threshold, proceed to operations at S6.

At S5, identify that the user terminal is a VoNR user terminal.

At S6, identify that the user terminal is not the VoNR user terminal.

Figure 2:
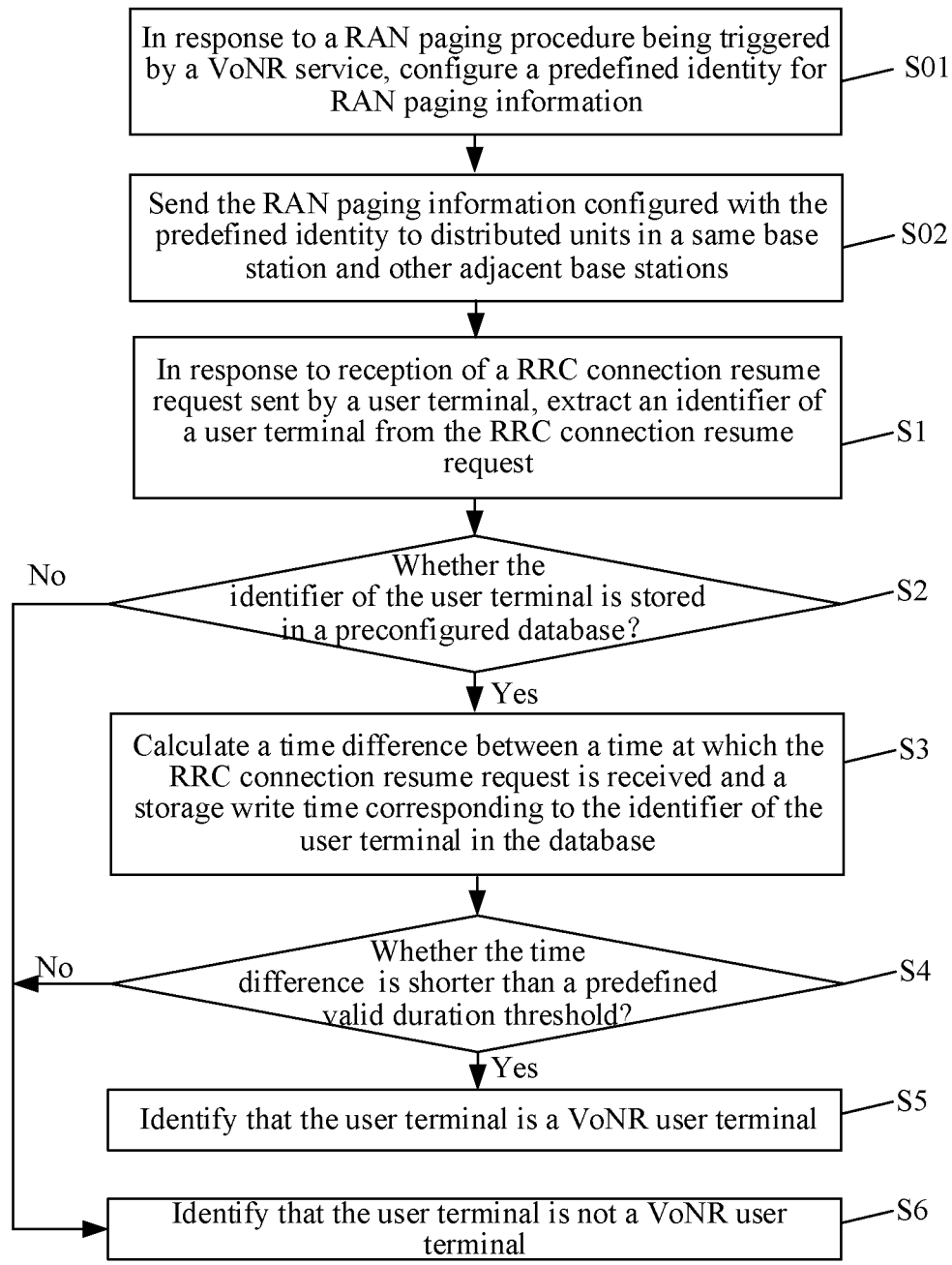
FIG. 2 is a flowchart of a VoNR user identification method according to another embodiment of the present disclosure.

FIG. 2 is a flowchart of a VoNR user identification method according to another embodiment of the present disclosure. The method is performed by the base station. In addition to the above operations at S1 to S6, the method further includes operations at S01 and S02. The operations at S01 and S02 will be described in detail below.

At S01, in response to a radio access network (RAN) paging procedure being triggered by a VoNR service, a predefined identity is configured for RAN paging information.

In response to the RAN paging procedure being triggered, the base station may detect whether the RAN paging procedure is triggered by a VoNR service related signaling. Specifically, when it is detected that the RAN paging procedure is triggered in response to an arrival of core network data of a quality of service (QoS) flow of 5QI5 (a 5G QoS identifier), or is triggered by a signaling of the QoS flow of 5QI1 or 5QI2 requested to be established by a data connection (PDU Session) modification request message issued by the core network, determine that the RAN paging procedure is triggered by the VoNR service related signaling, and thus the operation at S01 is performed. Otherwise, determine that the RAN paging procedure is not triggered by the VoNR service related signaling.

At S02, the RAN paging information configured with the predefined identity is sent to distributed units in a same base station and other adjacent base stations.

It is to be noted that the base station to which the called terminal belongs may also send RAN paging to the called terminal while sending the RAN paging information to the other adjacent base stations, so that the called terminal may trigger the RRC connection resume procedure in response to the RAN paging.

In the technical solution of the present disclosure, there is no restriction on an execution order of operations at S01 to S02 and operations at S1 to S6. That is, operations at S01 to S02 may be performed before or after the operations at S1 to S6, or the operations at S01 to S02 and the operations at S1 to S6 may be performed simultaneously.

In some embodiments, the predefined identity is a preset paging high-priority identity. Specifically, the paging high-priority identity may be configured for the RAN paging information by setting the protocol.

"Paging priority" is a field in existing 3GPP TS 38.473 protocol and 3GPP TS 38.423 protocol. The 3GPP TS 38.473 protocol specifies that a centralized unit sends a paging message to the distributed unit in a base station, and the 3GPP TS 38.423 protocol specifies that the RAN paging message is transmitted between two base stations. The paging high-priority identity is configured for the RAN paging information by configuring an attribute value of the paging priority in the 3GPP TS 38.473 protocol and the 3GPP TS 38.423 protocol.

In some embodiments, the "paging priority" field in the 3GPP TS 38.473 protocol and the 3GPP TS 38.423 protocol is configurated as follows.

| IE/Group Name | Presence | Range | IE type and reference | Semantics description |
|---|---|---|---|---|
| Paging Priority | M | ENUMERATED (PrioLevel1, PrioLevel2, PrioLevel3, PrioLevel4, PrioLevel5, PrioLevel6, PrioLevel7, PrioLevel8, . . . ) | | Lower value codepoint indicates higher priority. |

In other embodiments, the predefined identity is a preset user type identity. Specifically, the paging high-priority identity may be configured for the RAN paging information by setting the protocol.

More specifically, a "user type" cell is added in the existing 3GPP TS 38.473 protocol and 3GPP TS 38.423 protocol, and one or more attribute values corresponding to the "user type" cell are configured. In some embodiments, the "user type" field in the 3GPP TS 38.473 protocol and the 3GPP TS 38.423 protocol is configured as follows:

| IE/Group Name | Presence | Range | IE type and reference | Semantics description |
|---|---|---|---|---|
| User Type | O | ENUMERATED (mt-voice Call, mt-video Call, . . . ) | | It is defined as user type used to identify mt-voice Call or mt-video Call |

It should be noted that there is no restriction on a specific form and content of the predefined identity in the technical solution of the present disclosure. In the present disclosure, other manners may also be used to configure the predefined identity for the RAN paging information, which will not be described one by one here.

According to the above operations at S01 and S02, the predefined identity can be configured for the RAN paging information, so that the base station and the adjacent base stations can store or obtain the identifier of the called terminal and update the storage write time corresponding to the identifier of the called terminal. The detailed contents are illustrated in subsequent embodiments.

Figure 3:
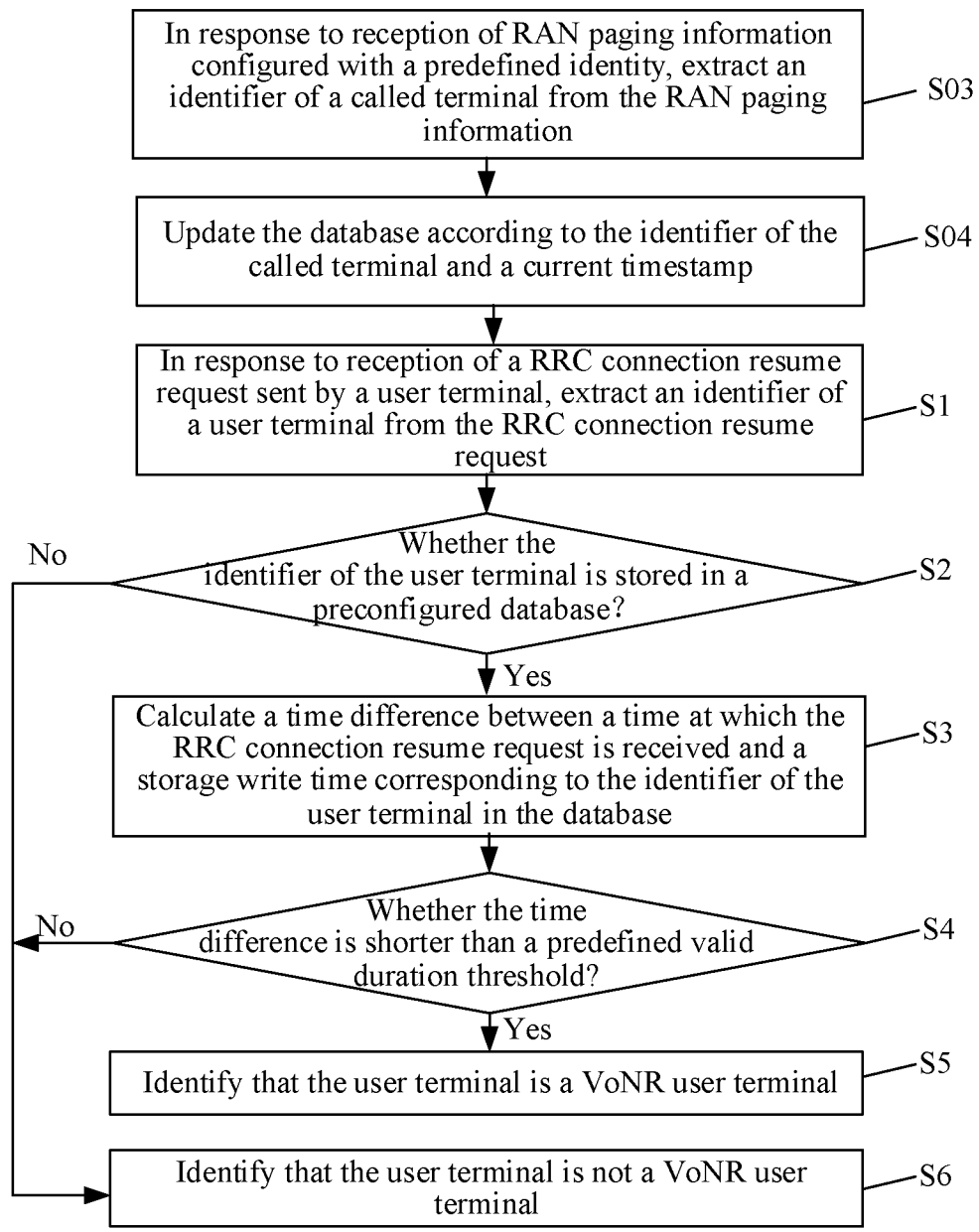
FIG. 3 is a flowchart of a VoNR user identification method according to yet another embodiment of the present disclosure.

FIG. 3 is a flowchart of a VoNR user identification method according to yet another embodiment of the present disclosure. In addition to the above operations at S1 to S6, the method further includes operations at S03 and S04. The following describes operations at S03 and S04 in detail.

At S03, in response to reception of the RAN paging information configured with the predefined identity, an identifier of a called terminal is extracted from the RAN paging information.

At S04, the database is updated according to the identifier of the called terminal and a current timestamp.

The current timestamp is used as a storage write time corresponding to the identifier of the called terminal.

According to the above operations at S03 and S04, the database for identifying whether the user is the VoNR user terminal may be updated.

Figure 4:
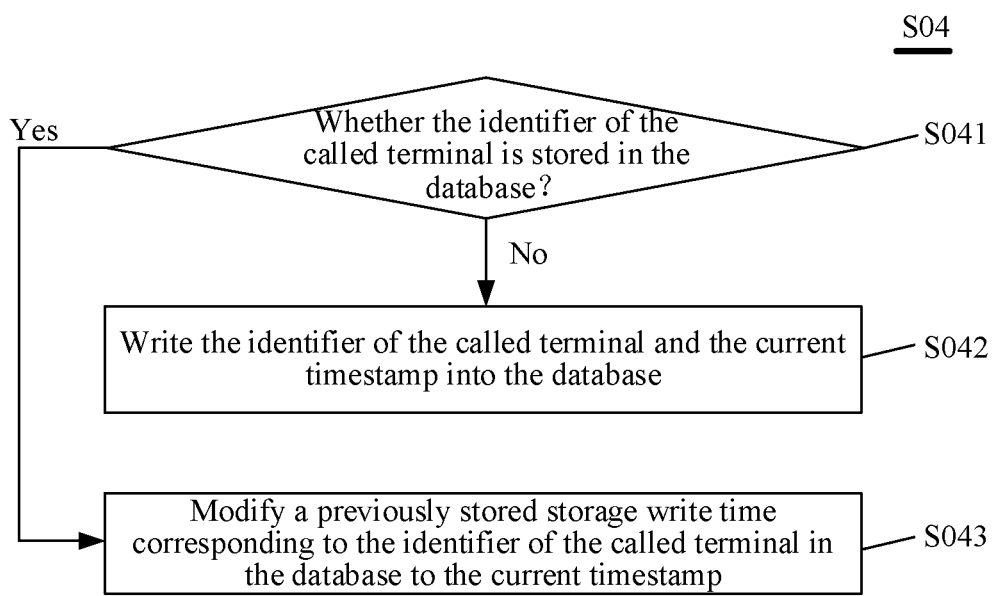
FIG. 4 is a flowchart of an optional implementation manner of operations at S04 according to an embodiment of the present disclosure.

FIG. 4 is a flowchart of an optional implementation manner of operations at S04 according to embodiments of the present disclosure. As illustrated in FIG. 4, operations at S04 include following operations.

At S041, whether the identifier of the called terminal is stored in the database is determined.

Based on a determination that the identifier of the called terminal is not stored in the database, proceed to operations at S042. Alternatively, based on a determination that the identifier of the called terminal is stored in the database, proceed to operations at S043.

At S042, the identifier of the called terminal and the current timestamp are written into the database.

At S043, a previously stored storage write time corresponding to the identifier of the called terminal in the database is modified to the current timestamp.

Based on the above operations at S041 and S043, the database may be updated.

Figure 5:
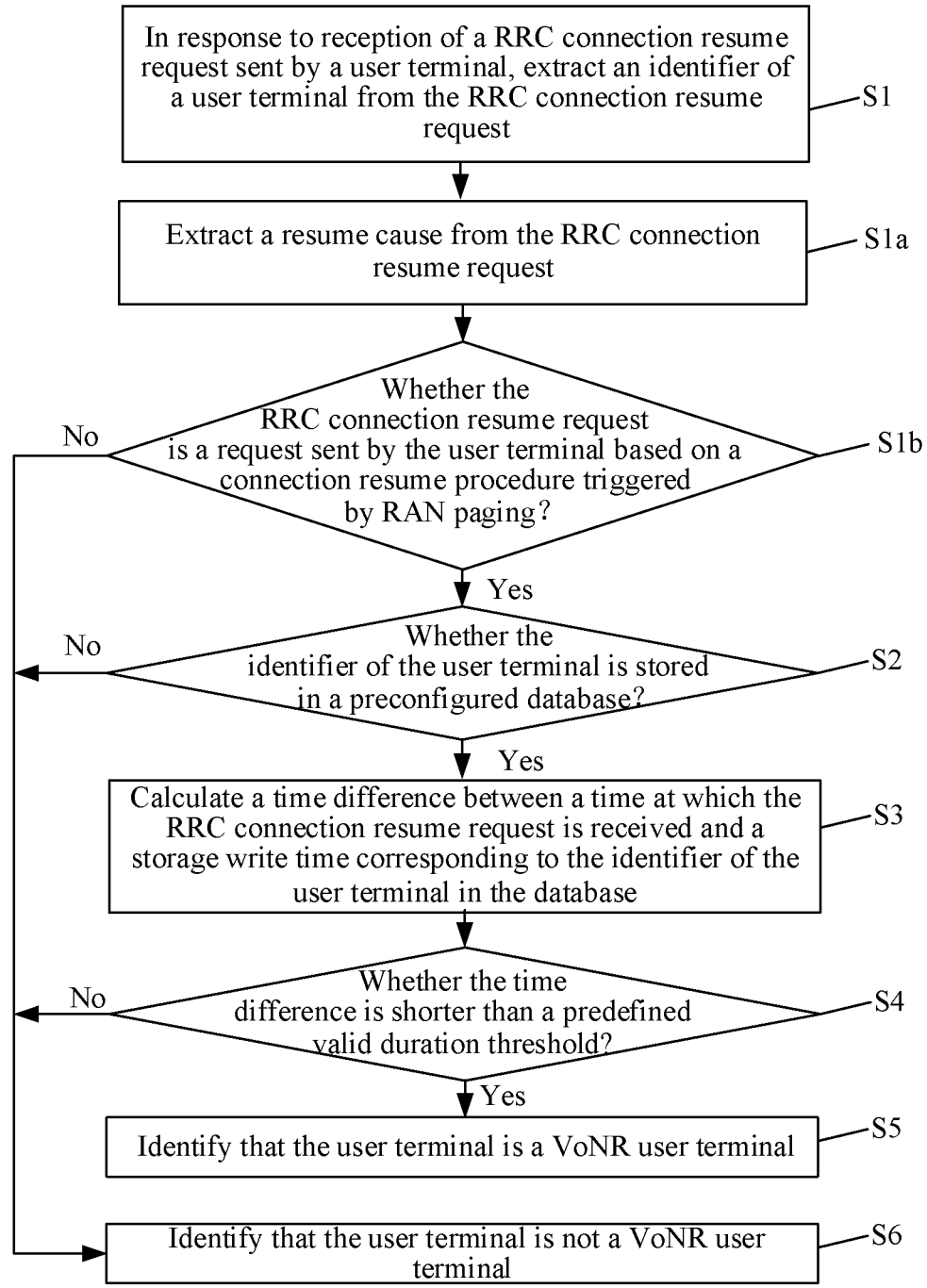
FIG. 5 is a flowchart of a VoNR user identification method according to still another embodiment of the present disclosure.

FIG. 5 is a flowchart of a VoNR user identification method according to still another embodiment of the present disclosure. The method is performed by the base station. In addition to the above operations at S1 to S6, the method further includes operations at S1a and operations at S1b. The following describes the operations at S1a and S1b in detail, where the operations at S1a is performed before operations at S2.

At S1a, a resume cause is extracted from the RRC connection resume request.

At S1b, whether the RRC connection resume request is a request sent by the user terminal based on a connection resume procedure triggered by RAN paging is identified and determined according to the resume cause.

The operations at S1b specifically include: detecting whether the resume cause is any one of a high priority access, a mobile terminating-access (MT-access), a mobile position service-priority access (MPS-Priority Access).

When the resume cause is any one of the high priority access, the MT-access, and the MPS-priority access, it is determined that the RRC connection resume request is the request sent by the user terminal based on the connection resume procedure triggered by the RAN paging. Otherwise, it is determined that the RRC connection resume request is not the request sent by the user terminal based on the connection resume procedure triggered by the RAN paging.

It can be understood that in the technical solution of the present disclosure, there is no restriction on an execution order of the operations at S1 and S1a. That is, the operations at S1 may be performed before or after the operations at S1a, or the operations at S1 and S1a may be performed simultaneously.

In operations at S1b, in response to determining that the RRC connection resume request is the request sent by the user terminal based on the connection resume procedure triggered by the RAN paging, proceed to operations at S2. In response to determining that the RRC connection resume request is not the request sent by the user terminal based on the connection resume procedure triggered by the RAN paging, proceed to operations at S6.

Figure 6:
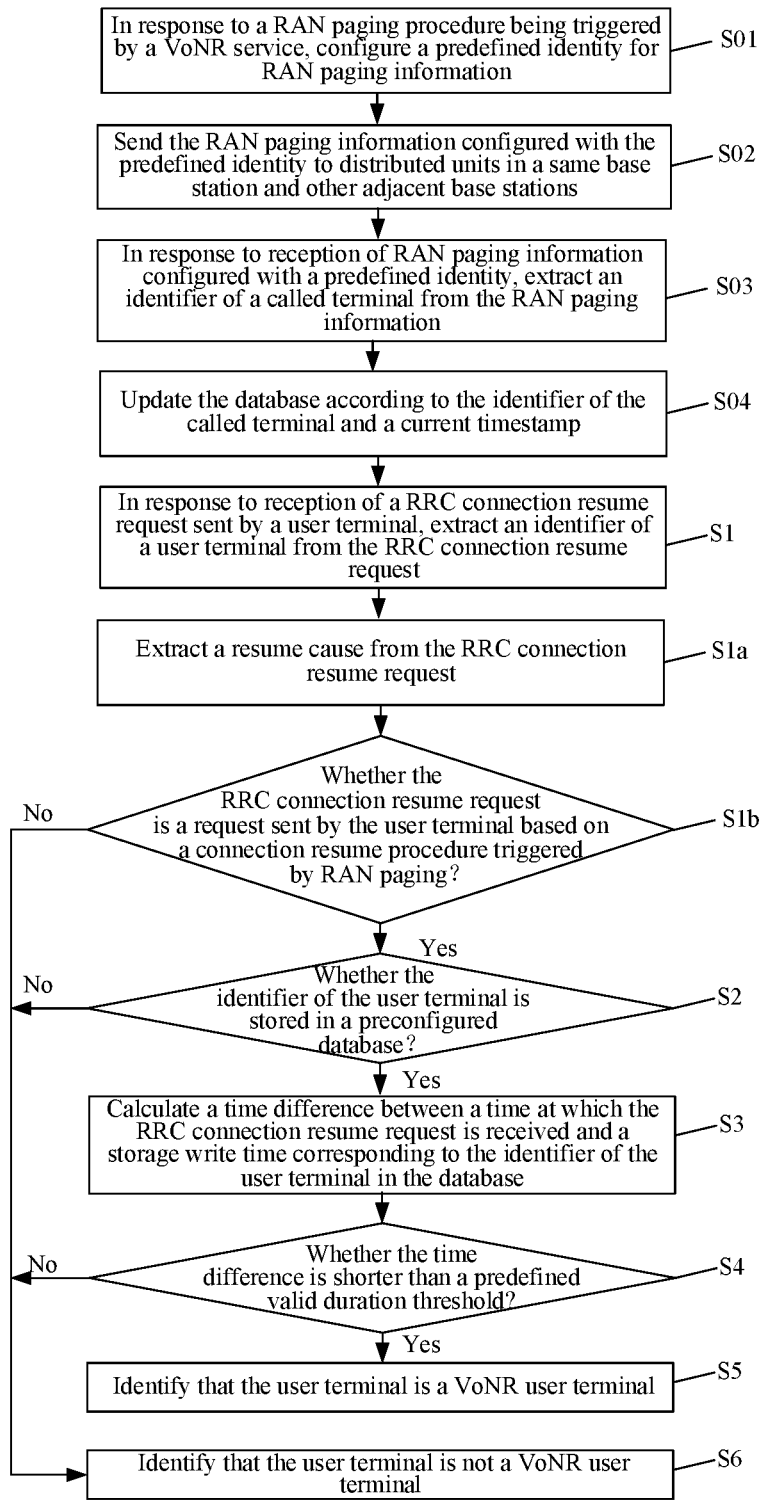
FIG. 6 is a flowchart of a VoNR user identification method according to still another embodiment of the present disclosure.

FIG. 6 is a flowchart of a VoNR user identification method according to still another embodiment of the present disclosure. As illustrated in FIG. 6, the method in FIG. 6 is a combination of some foregoing embodiments and specifically includes following operations.

At S01, in response to the RAN paging procedure being triggered by the VoNR service, the predefined identity is configured for the RAN paging information.

At S02, the RAN paging information configured with the predefined identity is sent to the distributed units in the same base station and other adjacent base stations.

It should be noted that the operations at S01 and S02 are performed by the base station to which the called terminal currently belongs.

At S03, in response to reception of the RAN paging information configured with the predefined identity, the identifier of the called terminal is extracted from the RAN paging information.

At S04, the database is updated according to the identifier of the called terminal and the current timestamp.

It should be noted that the above operations S03 and S04 can be performed by the base station to which the called terminal currently belongs or the adjacent base stations.

At S1, in response to reception of the RRC connection resume request sent by the user terminal, the identifier of the user terminal is extracted from the RRC connection resume request.

At S1a, the resume cause is extracted from the RRC connection resume request.

At S1b, whether the RRC connection resume request is the request sent by the user terminal based on the connection resume procedure triggered by the RAN paging is identified and determined according to the resume cause.

In operations at S1b, in response to determining that the RRC connection resume request is the request sent by the user terminal based on the connection resume procedure triggered by the RAN paging, the method proceeds to the operations at S2. Alternatively, in response to determining that the RRC connection resume request is not the request sent by the user terminal based on the connection resume procedure triggered by the RAN paging, the method proceeds to the operations at S6.

At S2, query whether the identifier of the user terminal is stored in a preconfigured database.

At S3, the time difference between the time at which the RRC connection resume request is received and the storage write time corresponding to the identifier of the user terminal in the database is calculated.

At S4, determine whether the time difference is shorter than the predefined valid duration threshold.

In response to determining that the time difference is shorter than the valid duration threshold, proceed to operations at S5. Otherwise, in response to determining that the time difference is greater than or equal to the valid duration threshold, proceed to operations at S6.

At S5, identify that the user terminal is the VoNR user terminal.

At S6, identify that the user terminal is not the VoNR user terminal.

It should be noted that the base station to which the called terminal currently belongs and the adjacent base stations all can perform the above operations at S1 to S6, and are base stations to which the called terminal is randomly accessed during establishment of a RRC connection. The base station to which the called terminal is randomly accessed may or may not be the base station that perform the operations S01 and S02, which all belong to the protection scope of the present disclosure.

Figure 7:
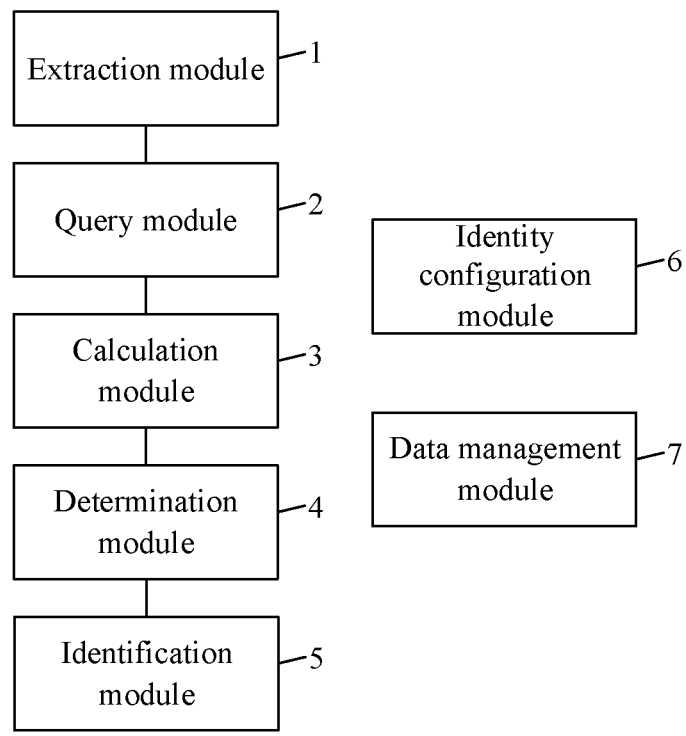
FIG. 7 is a schematic functional structure diagram of a base station according to an embodiment of the present disclosure.

FIG. 7 is a schematic functional structure diagram of a base station according to an embodiment of the present disclosure. As illustrated in FIG. 7, the base station may perform the VoNR user identification method according to the above embodiments. The base station includes: an extraction module, a query module, a calculation module, a determination module, and an identification module.

The extraction module is configured to extract, in response to a RRC connection resume request, an identifier of a user terminal from the RRC connection resume request.

The query module is configured to query whether the identifier of the user terminal is stored in a preconfigured database, where several identifiers and a storage write time corresponding to each of the several identifiers are stored in the database.

The calculation module is configured to calculate a time difference between a time at which the RRC connection resume request is received and a storage write time corresponding to the identifier of the user terminal in the database when the query module queries that the identifier of the user terminal is stored in the database.

The determination module is configured to determine whether the time difference is shorter than a predefined valid duration threshold.

The identification module is configured to identify that the user terminal is a VoNR user terminal when the determination module determines that the time difference is shorter than the valid duration threshold; or identify that the user terminal is not the VoNR user terminal when the determination module determines that the time difference is not shorter than the valid duration threshold.

In some embodiments, the base station further includes: an identity configuration module. The identity configuration module is located on a centralized unit side in the base station. The identity configuration module is configured to configure, in response to a RAN paging procedure being triggered by a VoNR service, a predefined identity for RAN paging information; and send the RAN paging information configured with the predefined identity to distributed units in a same base station and other adjacent base stations.

In some embodiments, the base station further includes: a data management module, where the data management module is located on a distributed unit side in the base station. The data management module is configured to extract, in response to reception of the RAN paging information configured with the predefined identity, an identifier of a called terminal from the RAN paging information; and update the database according to the identifier of the called terminal and a current timestamp; where, the current timestamp is used as a storage write time corresponding to the identifier of the called terminal.

For specific description of each module in the base station provided in embodiments, reference may be made to corresponding content in the method embodiments, which are not repeated herein.

Some embodiments of the present disclosure further provide a computer-readable medium storing a computer program which, when executed by a processor, causes the processor to perform the VoNR user identification method according to the above embodiments.

Figure 8:
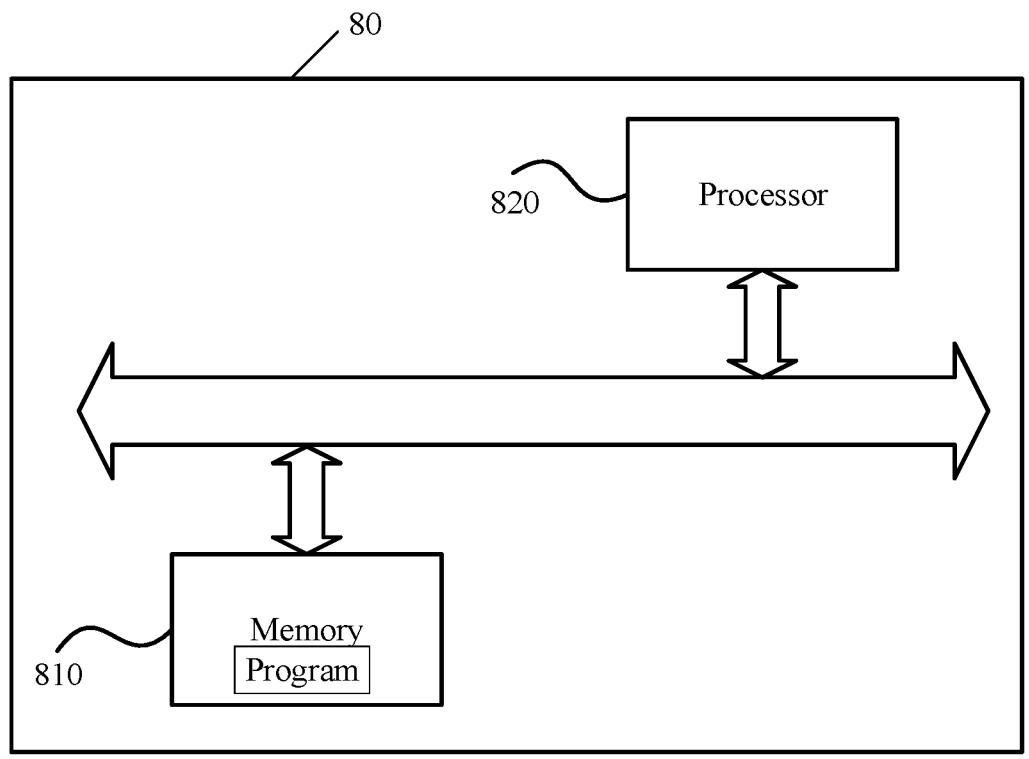
FIG. 8 is a block diagram of a base station according to an embodiment of the present disclosure.

As illustrated in FIG. 8, some embodiments of the present disclosure further provide a base station 80, including a memory 810 and a processor 820. The memory 810 stores a program. The program, when read and executed by the processor 820, cause the processor 820 to perform the above-mentioned VoNR user identification method.

Those of ordinary skill in the art can understand that all or some of the operations, system, functional modules/units of the device in the methods disclosed above may be implemented as software, firmware, hardware, and appropriate combinations thereof. In a hardware implementation, the division between functional modules/units mentioned in the above description does not necessarily correspond to the division of physical components. For example, a physical component may have multiple functions, or a function or step may be performed by several physical components cooperatively. Some or all of the components may be implemented as software executed by a processor, such as a central processing unit, a digital signal processor or a microprocessor, or as hardware, or as an integrated circuit, such as an application specific integrated circuit. Such software may be distributed on a computer-readable medium, and the computer-readable medium may include a computer storage medium (or a non-transitory medium) and a communication medium (or a transitory medium). As known to those of ordinary skill in the art, the term computer storage medium includes volatile and non-volatile, removable and non-removable medium implemented in any method or technology for storing information (such as computer-readable instructions, data structures, program modules, or other data). Computer storage mediums include but are not limited to a random access memory (RAM), a read-only memory (ROM), an electrically erasable programmable read-only memory (EEPROM), a flash memory or other memory technologies, a compact disc read-only memory (CD-ROM), a digital video disc (DVD) or other optical disk storage, a magnetic cassette, a magnetic tape, a magnetic disk storage or other magnetic storage devices, or any other medium used to store desired information and that may be accessed by a computer. In addition, as known to those of ordinary skill in the art, communication mediums usually contain a computer-readable instruction, a data structure, a program module, or other data in a modulated data signal such as a carrier wave or other transmission mechanisms, and may include any information delivery medium.

Exemplary embodiments have been disclosed herein, and although specific terms are employed, they are used and should only be construed in a general descriptive sense and not for purposes of limitation. In some examples, it will be apparent to those skilled in the art that features, characteristics and/or elements described in connection with a particular embodiment may be used alone or in combination with features and/or elements described in other embodiments, unless expressly stated otherwise. Accordingly, it will be understood by those of ordinary skill in the art that various changes in form and details may be made therein without departing from the scope of the present disclosure as set forth in the appended claims.

What is claimed is:

1. A voice over new radio (VoNR) user identification method, performed by a base station, comprising:
  extracting, in response to a radio resource control (RRC) connection resume request, an identifier of a user terminal from the RRC connection resume request;
  querying whether the identifier of the user terminal is stored in a preconfigured database, wherein a plurality of identifiers of called terminals and a storage write time corresponding to each of the plurality of identifiers are stored in the preconfigured database, with the plurality of identifiers being extracted from radio access network (RAN) paging information triggered by VoNR services;
  calculating a time difference between a time when the RRC connection resume request is received and a storage write time corresponding to the identifier of the user terminal in the preconfigured database, in response to the identifier of the user terminal being stored in the preconfigured database;
  determining whether the time difference is shorter than a predefined valid duration threshold; and
  identifying that the user terminal is a VoNR user terminal, in response to the time difference being shorter than the predefined valid duration threshold,
  wherein the method further comprises:
  extracting, in response to reception of RAN paging information configured with a predefined identity, the identifier of the user terminal from the RAN paging information; and
  updating the preconfigured database according to the identifier of the user terminal and a current timestamp, wherein the current timestamp is determined as a storage write time corresponding to the identifier of the user terminal.

2. The method according to claim 1, further comprising:
  configuring, in response to a radio access network (RAN) paging procedure being triggered by a VoNR service related signaling, a predefined identity for RAN paging information; and
  sending the RAN paging information configured with the predefined identity to distributed units in a same base station and other adjacent base stations.

3. The method according to claim 1, wherein updating the preconfigured database according to the identifier of the user terminal and the current timestamp comprises:
  determining whether the identifier of the user terminal is stored in the preconfigured database;
  writing the identifier of the user terminal and the current timestamp into the preconfigured database based on a determination that the identifier of the user terminal is not stored in the preconfigured database; and
  modifying a previously stored storage write time corresponding to the identifier of the user terminal in the preconfigured database to the current timestamp based on a determination that the identifier of the user terminal is stored in the preconfigured database.

4. The method according to claim 2, wherein the predefined identity is a preset paging high-priority identity or a preset user type identity.

5. The method according to claim 1, wherein the identifier is an inactive-radio network temporary identity (I-RNTI).

6. The method according to claim 1, further comprising:
before querying whether the identifier of the user terminal is stored in the preconfigured database:
extracting a resume cause from the RRC connection resume request; and
determining, according to the resume cause, whether the RRC connection resume request is a request sent by the user terminal based on a connection resume procedure triggered by RAN paging;
querying, in response to determining that the RRC connection resume request is the request sent by the user terminal based on the connection resume procedure triggered by the RAN paging, whether the identifier of the user terminal is stored in the preconfigured database.

7. The method according to claim 6, wherein determining, according to the resume cause, whether the RRC connection resume request is the request sent by the user terminal based on the connection resume procedure triggered by the RAN paging comprises:
detecting whether the resume cause is any one of a high priority access, a mobile terminating access (MT-Access), and a mobile position service-priority access (MPS-Priority Access); and
determining, in response to detecting that the resume cause is any one of the high priority access, the MT-Access, and the MPS-Priority Access, that the RRC connection resume request is the request sent by the user terminal based on the connection resume procedure triggered by the RAN paging.

8. A non-transitory computer-readable medium, applied to a base station, storing a computer program that, when executed by a processor, causes the processor to:
extract, in response to a radio resource control (RRC) connection resume request, an identifier of a user terminal from the RRC connection resume request;
query whether the identifier of the user terminal is stored in a preconfigured database, wherein a plurality of identifiers of called terminals and a storage write time corresponding to each of the plurality of identifiers are stored in the preconfigured database, with the plurality of identifiers being extracted from radio access network (RAN) paging information triggered by VoNR services;
calculate a time difference between a time when the RRC connection resume request is received and a storage write time corresponding to the identifier of the user terminal in the preconfigured database, in response to the identifier of the user terminal being stored in the preconfigured database;
determine whether the time difference is shorter than a predefined valid duration threshold; and
identify that the user terminal is a VoNR user terminal, in response to the time difference being shorter than the predefined valid duration threshold,
wherein the computer program, when executed by the processor, further causes the processor to:
extract, in response to reception of RAN paging information configured with a predefined identity, the identifier of the user terminal from the RAN paging information; and
update the preconfigured database according to the identifier of the user terminal and a current timestamp, wherein the current timestamp is determined as a storage write time corresponding to the identifier of the user terminal.

9. The non-transitory computer-readable medium according to claim 8, wherein the computer program, when executed by the processor, further causes the processor to:
configure, in response to a radio access network (RAN) paging procedure being triggered by a VoNR service related signaling, a predefined identity for RAN paging information; and
send the RAN paging information configured with the predefined identity to distributed units in a same base station and other adjacent base stations.

10. The non-transitory computer-readable medium according to claim 8, wherein the computer program executed by the processor to update the preconfigured database according to the identifier of the user terminal and the current timestamp is executed by the processor to perform:
determine whether the identifier of the user terminal is stored in the preconfigured database;
write the identifier of the user terminal and the current timestamp into the database based on a determination that the identifier of the user terminal is not stored in the preconfigured database; and
modify a previously stored storage write time corresponding to the identifier of the user terminal in the preconfigured database to the current timestamp based on a determination that the identifier of the user terminal is stored in the preconfigured database.

11. The non-transitory computer-readable medium according to claim 8, wherein the computer program, when executed by the processor, further causes the processor to:
before querying whether the identifier of the user terminal is stored in the preconfigured database preconfigured:
extract a resume cause from the RRC connection resume request; and
determine, according to the resume cause, whether the RRC connection resume request is a request sent by the user terminal based on a connection resume procedure triggered by RAN paging;
query, in response to determining that the RRC connection resume request is the request sent by the user terminal based on the connection resume procedure triggered by the RAN paging, whether the identifier of the user terminal is stored in the preconfigured database preconfigured.

12. The non-transitory computer-readable medium according to claim 11, wherein the computer program executed by the processor to determine, according to the resume cause, whether the RRC connection resume request is the request sent by the user terminal based on the connection resume procedure triggered by the RAN paging is executed by the processor to:
detect whether the resume cause is any one of a high priority access, a mobile terminating access (MT-Access), and a mobile position service-priority access (MPS-Priority Access); and
determine, in response to detecting that the resume cause is any one of the high priority access, the MT-Access, and the MPS-Priority Access, that the RRC connection resume request is the request sent by the user terminal based on the connection resume procedure triggered by the RAN paging.

13. A base station, comprising a memory and a processor, wherein the memory stores a program that, when read and executed by the processor, causes the processor to:
extract, in response to a radio resource control (RRC) connection resume request, an identifier of a user terminal from the RRC connection resume request;

query whether the identifier of the user terminal is stored in a preconfigured database, wherein a plurality of identifiers of called terminals and a storage write time corresponding to each of the plurality of identifiers are stored in the preconfigured database, with the plurality of identifiers being extracted from radio access network (RAN) paging information triggered by VoNR services;

calculate a time difference between a time at which the RRC connection resume request is received and a storage write time corresponding to the identifier of the user terminal in the preconfigured database, in response to the identifier of the user terminal being stored in the preconfigured database;

determine whether the time difference is shorter than a predefined valid duration threshold; and identify that the user terminal is a VoNR user terminal, in response to the time difference being shorter than the predefined valid duration threshold, wherein the program, when executed by the processor, further causes the processor to:

extract, in response to reception of RAN paging information configured with a predefined identity, the identifier of the user terminal from the RAN paging information; and update the preconfigured database according to the identifier of the user terminal and a current timestamp, wherein the current timestamp is determined as a storage write time corresponding to the identifier of the user terminal.

14. The base station according to claim 13, wherein the program, when executed by the processor, further causes the processor to:

configure, in response to a radio access network (RAN) paging procedure being triggered by a VoNR service related signaling, a predefined identity for RAN paging information; and send the RAN paging information configured with the predefined identity to distributed units in a same base station and other adjacent base stations.

15. The base station according to claim 13, wherein the program executed by the processor to update the preconfigured database according to the identifier of the user terminal and the current timestamp is executed by the processor to:

determine whether the identifier of the user terminal is stored in the preconfigured database;

write the identifier of the user terminal and the current timestamp into the preconfigured database based on a determination that the identifier of the user terminal is not stored in the preconfigured database; and modify a previously stored storage write time corresponding to the identifier of the user terminal in the preconfigured database to the current timestamp based on a determination that the identifier of the user terminal is stored in the preconfigured database.

16. The base station according to claim 13, wherein the program, when executed by the processor, further causes the processor to:

before querying whether the identifier of the user terminal is stored in the preconfigured database:

extract a resume cause from the RRC connection resume request; and determine, according to the resume cause, whether the RRC connection resume request is a request sent by the user terminal based on a connection resume procedure triggered by RAN paging; and query, in response to determining that the RRC connection resume request is the request sent by the user terminal based on the connection resume procedure triggered by the RAN paging, whether the identifier of the user terminal is stored in the preconfigured database preconfigured.

17. The base station according to claim 16, wherein the program executed by the processor to determine, according to the resume cause, whether the RRC connection resume request is the request sent by the user terminal based on the connection resume procedure triggered by the RAN paging is executed by the processor to:

detect whether the resume cause is any one of a high priority access, a mobile terminating access (MT-Access), and a mobile position service-priority access (MPS-Priority Access); and determine, in response to detecting that the resume cause is any one of the high priority access, the MT-Access, and the MPS-Priority Access, that the RRC connection resume request is the request sent by the user terminal based on the connection resume procedure triggered by the RAN paging.

* * * * *